Dec. 2, 1941.   R. L. FOSTER   2,264,517
SURGE CONTROLLING DEVICE
Filed Jan. 23, 1939   3 Sheets-Sheet 1

RALPH L. FOSTER,
INVENTOR.
BY
ATTORNEY

Dec. 2, 1941.   R. L. FOSTER   2,264,517
SURGE CONTROLLING DEVICE
Filed Jan. 23, 1939   3 Sheets-Sheet 2

RALPH L. FOSTER,
INVENTOR.
BY
ATTORNEY

Dec. 2, 1941.   R. L. FOSTER   2,264,517
SURGE CONTROLLING DEVICE
Filed Jan. 23, 1939   3 Sheets-Sheet 3
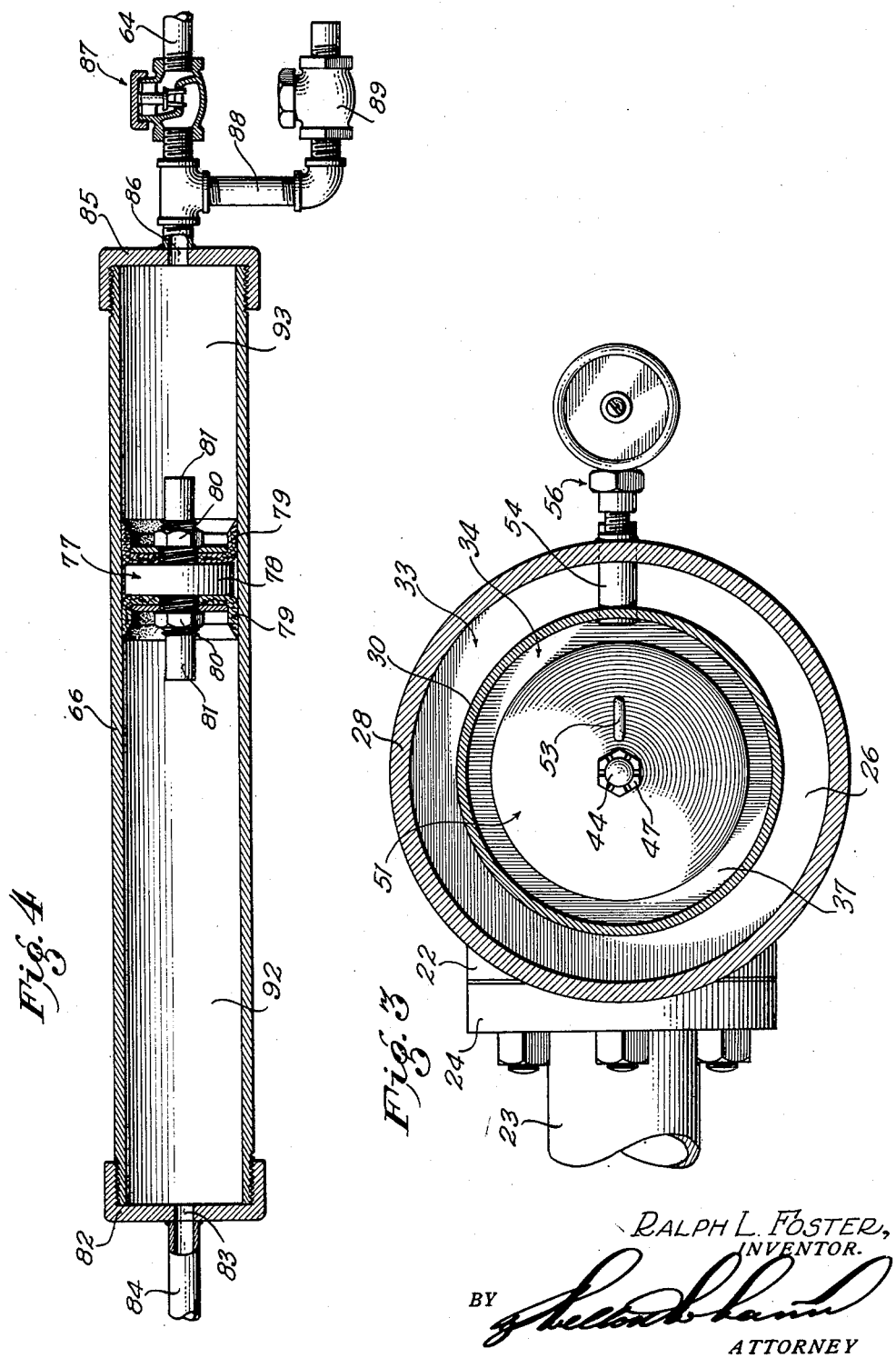
RALPH L. FOSTER,
INVENTOR.
BY
ATTORNEY Patented Dec. 2, 1941

2,264,517

UNITED STATES PATENT OFFICE 2,264,517

SURGE CONTROLLING DEVICE

Ralph L. Foster, Houston, Tex., assignor to Emsco Derrick & Equipment Company, Los Angeles, Calif., a corporation of California Application January 23, 1939, Serial No. 252,434

11 Claims. (Cl. 138—26)

My invention relates to a device for minimizing the effect of surges in a fluid transmission line, and is particularly adapted to use in conjunction with high-pressure piping through which liquid material is being pumped by reciprocating pumps.

The invention is especially adapted for use on the outlet of a mud-pump such as employed in rotary well drilling equipment to deliver drilling mud at high pressure to the upper end of a string of drill pipe employed in the rotary drilling operation. In pumps of this character pressures between two and three thousand pounds are often reached and the pounding effects of surges in the mud transmission pipes or ducts are very pronounced.

It is an object of the present invention to provide a surge device which minimizes the effects of heavy surges and eliminates knocking and pounding of both large and small surges.

An object of the invention is to provide a surge device having a pair of air chambers to serve as surge absorbing or controlling means, one of these air chambers being effective at low pressure and the other of the air chambers becoming effective through a higher range of pressures and having the capacity to absorb relatively large surges involving high pressure, thereby preventing laboring of the pump in event of a surge at a pressure considerably higher than the normal pressure against which the pump is operating.

It is a further object of the invention to provide a surge device having a primary surge chamber in open connection with the duct in which fluid is being transmitted under pressure and a secondary surge chamber having valve means normally closed at relatively low pressure and being arranged so as to automatically open in response to relatively high pressures in the duct, there being means for maintaining a relatively high air pressure in the secondary chamber.

A further object is to provide a device of this character having means for maintaining in the secondary surge chamber a pressure of air maintained at a value corresponding to the pressure against which the pump is operating.

A further object of the invention is to provide a surge device of the above character wherein the secondary air chamber is supplied with air under pressure from a pump operated by a motor which has direct connection with the cylinder of a mud pump, or the like, which operates to force liquid into the duct.

A further object of the invention is to provide a device of the character hereinabove described having a primary air chamber in open communication with the duct and a secondary chamber provided with a narrow passage for connecting it with the duct, this valve passage being provided with valve means normally held in closed relation by pressure existing within the secondary chamber, and having means which will hold the valve in open relation when the quantity of liquid in the secondary chamber exceeds a prescribed amount.

A further object of the invention is to provide a surge device having primary and secondary air chambers, as hereinbefore set forth, the secondary air chamber being provided with means for supplying it with air under pressure to maintain a desired air pressure therein, and having a release valve for releasing air from the chamber in excess of a prescribed maximum pressure.

Further objects and advantages of the invention will be brought out in the following part of the specification.

Referring to the drawings which are for illustrative purposes only:

Fig. 3 is a section taken as indicated by the line 3—3 of Fig. 2.

Fig. 4 is an enlarged longitudinal section of the air makeup pump shown in Fig. 1.

Figure 1:
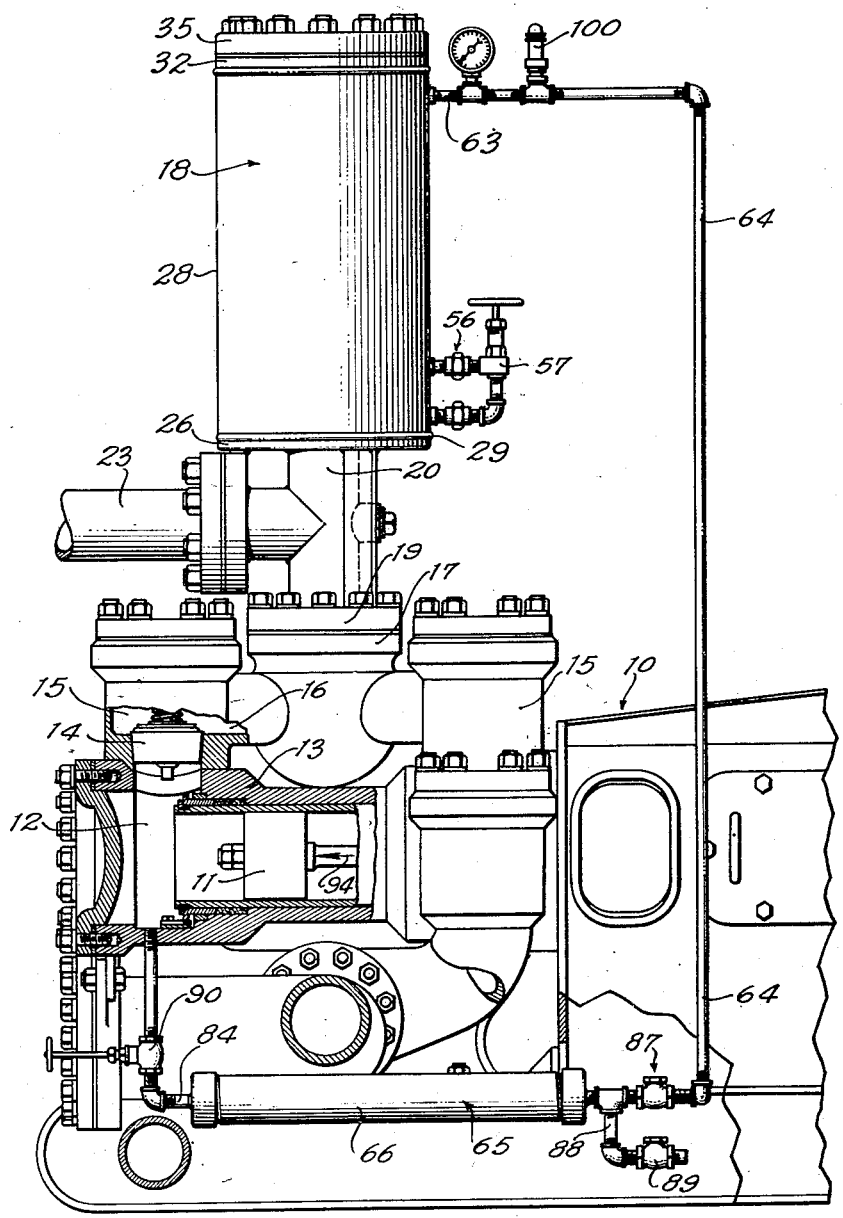
Fig. 1 is a partly sectioned view showing a preferred form of my invention connected to the outlet of a high pressure pump, such as a mud pump.

In Fig. 1 I show a mud or slush pump 10 having a piston 11 which operates to force the mud from a pumping space 12 in the end of a cylinder 13, through a discharge valve 14 into a valve chamber 15 which communicates with a discharge or outlet manifold 16 provided with a flange 17 to which transfer piping may be connected by use of a companion flange, in the customary manner.

Figure 2:
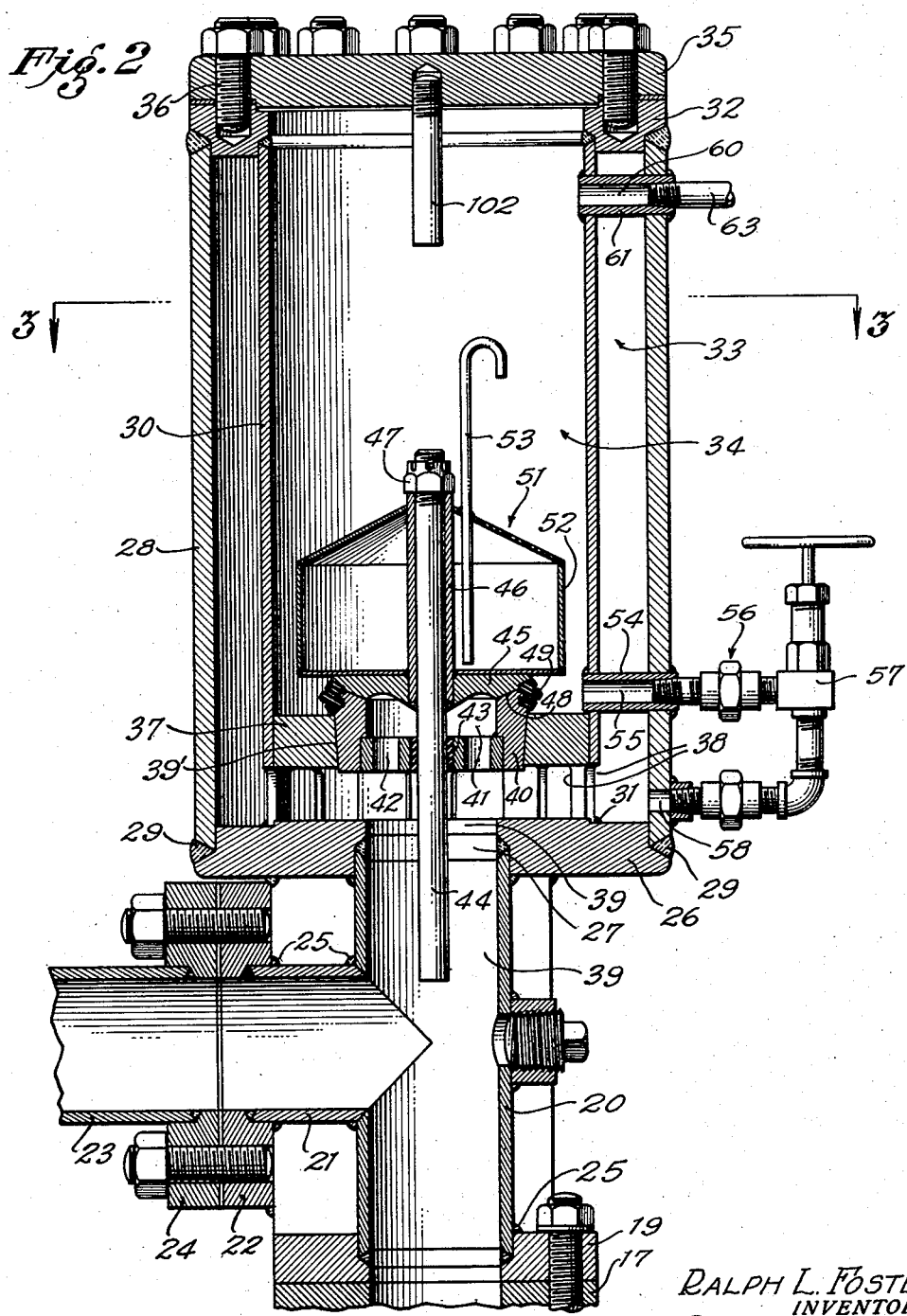
Fig. 2 is an enlarged vertical section through the surge device disclosed in Fig. 1.

In the preferred use of my surge device 18, I provide it with a flange 19 whereby it may be bolted directly to the outlet flange 17 of the pump 10. As shown in Figs. 1 and 2, a pipe 20 extends upward from the flange 19, and leading from the sides thereof there is a short nipple 21 having a flange 22 so that a pipe 23 forming a part of the duct or piping of the mud transfer system may be connected by means of a companion flange 24. It will be understood that in this preferred practice of my invention the various parts are formed from steel and are preferably connected together by welds 25.

A plate 26 is provided with a substantially centralized opening 27 and is welded to the upper end of the pipe 20. An outer cylindrical wall 28 is connected to the plate 26 by a weld 29, in position to extend upwardly therefrom, and an inner cylindrical wall 30 is disposed in coaxial relation within the cylindrical wall 28. The lower end of the cylindrical wall 30 is connected to the plate by welds 31 and a ring 32 is welded to the upper ends of the walls 28 and 30 in position to close the upper end of the annular space 33, which will be referred to hereinafter as the primary air chamber. The inner cylindrical wall 30 forms a secondary chamber 34, the upper end of which is closed by a head plate 35 secured to the ring 32 by stud bolts 36. A plate 37 is secured across the lower portion of the inner cylindrical wall 30 in a position spaced from the bottom plate 26, and openings 38 through the portion of the cylindrical wall 30 projecting below the plate 37 provide communication between the lower end of the primary air chamber 33 and the inlet passage 39 of the surge device formed by upper portion of the pipe 20.

The bottom wall 37 of the secondary air chamber 34 has an opening 39' receiving an annular member 40 which provides an opening or valve passage 41 providing communication between the lower part of the secondary air chamber 34 and the inlet passage 39. A spider 42 is set into the lower portion of the annular member 40, this spider 42 carrying a guide sleeve 43 for a guide rod 44 which has a valve closure member or plate 45 connected to the upper portion thereof by means of a sleeve 46 and a nut 47. This valve plate 45 is adapted to engage an upwardly faced valve seat 48, preferably at the upper end of the annular wall 40, and being supplemented by an annular rubber sealing element 49. A float 51 is mounted on the upper part of the valve plate 45, this float comprising a metal chamber 52 having a pressure equalizing tube 53 extending through the upper wall thereof. Drainage and pressure release means for the secondary chamber 34 is provided in the form of a tube 54 welded in a position to extend through the walls 28 and 30 in a position close to the upper face of the plate 37, the passage 55 formed by this tube being connected through suitable fittings 56 and a valve 57 with an opening 58 which passes through the lower portion of the wall 28 so as to communicate through the lower portion of the primary chamber 33 and the openings 38 with the inlet passage 39.

In the preferred use of my invention air, or other gas, is delivered at desired pressure into the upper part of the secondary chamber 34. For this purpose I have shown an inlet passage 60 formed by a metal tube 61, welded in place as shown in Fig. 2. An air pressure pipe 63 is connected to the passage 60. As shown in Fig. 1, the air pressure pipe may be connected through suitable piping 64 with an air pump 65, including, as shown in Fig. 4, a cylinder 66 having a free piston 77 therein comprising a metal body 78 with sealing cups 79 secured to the opposite faces thereof by nuts 80 threaded onto axially projecting stems 81 which serve as stops. The leftward end of the cylinder 66 is provided with a cap 82 having an opening 83 which communicates with piping 84 for a pressure actuating fluid for causing reciprocation of the piston 77 in the cylinder 66. The rightward end of the cylinder 66 is provided with a cap 85 having an opening 86 communicating with the lower end of the piping 64, which, as shown in Fig. 4, has a check valve 87 therein, there being an air inlet pipe 88 connected into the piping 64 at a point between the check valve 87 and the opening 86, this air inlet piping having a check valve 89 which will permit entry of air through the inlet pipe 88 but will prevent escape of air therethrough. As shown in Fig. 1, the pressure fluid piping 84 is preferably provided with a shut-off or control valve 90, and such piping 84 connects into the lower portion of the pumping space 12 at one end of the cylinder 13 of the mud pump. Accordingly, as the piston 11 is reciprocated, the space 92 within the cylinder 66 to the left of the piston 77 will be alternately subjected to suction and to pressure, causing reciprocation of the piston 77 so that it will alternately draw air into the rightward end 93 of the cylinder 66 and discharge the same through the piping 64 into the upper part of the secondary air chamber 34.

Owing to the fact that the mud discharged from the pumping chamber 12, upon forward stroke of the piston 11, indicated by the arrow 94 of Fig. 1, passes through the orifices of the check valve 14, the pressure built up in the chamber 12 during the pumping stroke will be higher than the normal or average pressure existing in the duct 23. If the cylinder 66 is made of constant diameter from end to end, the pressure transmitted to the air pumped from the rightward end 93 thereof will be approximately the normal pressure of mud exerted against the lower face of the valve plate 45, Fig. 2, although in some practices of the invention the pressure in the chamber 34 may be higher than the pressure in the pipe 23. The pressure of air transmitted through the piping 64 may be reduced, as desired, by setting an air release valve 100 in the piping 64, so that it will exhaust at the selected pressure. It will be recognized that higher air pressures may be readily attained by suitable design of the air pumping device 64 in accordance with well known principles of the pumping art.

Owing to the air pressure in the secondary chamber 34 being greater than the normal pressure of fluid in the passage 39, Fig. 2, the valve plate 45 will be normally maintained in closed position as shown, and surges within a low range of pressures will be absorbed by the primary air chamber 33. Should a heavy surge occur, wherein the pressure is greater than the air pressure existing within the secondary chamber 34, the valve plate 45 will be lifted so as to open the valve of the secondary chamber 34, permitting fluid to flow into the lower part of the chamber 34, thereby providing compensation for the heavy surge. As the pressure of the surge reduces, fluid will flow from the lower part of the secondary chamber 34 through the open valve. The valve plate will be maintained in open position so long as there is sufficient liquid, for example drilling mud, therein to support the float 51 so that it will hold the valve plate 45 in raised position. Upward movement of the float 51 and the part attached thereto is limited by a stop 102 consisting of a bar which is threaded into the head plate 35 in downward projecting position. The valve 45 will close before all of the liquid has discharged from the secondary chamber 34; therefore, air under pressure from the chamber 34 will not be permitted to escape into the pipe lines to form air pockets therein. Should a heavy and excessive surge pass into the secondary chamber 34, the reduction in the volume of the air in the upper part of the chamber 34 might produce such high pressure as to cause a release of air through the release valve 100, but air lost in this manner will be soon replaced in consequence of the actuation of the air pumping device 65.

I claim as my invention:

1. In a surge device of the character described, for connection with a pressure fluid transmission system including a duct, the combination of: a primary air chamber, in open communication with said duct, and a secondary air chamber connected to said duct; means for admitting air to said secondary air chamber to build up a pressure therein; valve means placed so as to be capable of resisting entry of fluid into said secondary chamber from said duct, said valve means being urged toward closed relation by the pressure of air in said chamber and opened by a superior pressure of fluid in said duct; and a float in said chamber having operative connection with said valve means and being operated by fluid which has entered said chamber to hold said valve means in open relation so that fluid may flow from said secondary chamber to said duct.

2. In a surge device of the character described, for connection with a fluid transmission system including a duct, the combination of: a primary air chamber connected to said duct; a secondary air chamber, a member forming a valve passage connecting said secondary chamber to said duct, there being a valve seat in said member disposed so as to face toward the interior of said secondary chamber; a valve closure member to cooperate with said valve seat and being adapted to be urged into closed relation to said valve seat by fluid pressure within said secondary chamber; a float mounted on said closure member in said secondary chamber; and means for admitting air to said secondary chamber to build up a pressure therein.

3. In a surge device for use with a pipe-line or fluid passage in which periodic pressure impulses occur, the combination of: an outer shell having an inlet passage at its lower end for connection to said fluid passage; an inner shell disposed within said outer shell so as to form a primary air chamber between said outer shell and said inner shell with the lower end of said primary air chamber in open communication with said inlet passage, said inner shell forming a secondary air chamber and there being a valve passage connecting the lower end of said secondary chamber with said inlet passage; and valve means for said valve passage, constructed so as to be closed at relatively low pressure and to automatically open in response to pressures in said fluid passage exceeding a prescribed value.

4. In a surge device of the character described, for connection with a liquid transmission system including a duct, the combination of: a primary air chamber connected to said duct; a secondary air chamber, a member forming a valve passage connecting said secondary chamber to said duct, there being a valve seat in said member disposed so as to face toward the interior of said secondary chamber; a valve closure member to cooperate with said valve seat and being adapted to be urged into closed relation to said valve seat by fluid pressure within said secondary chamber, said valve seat being opened by a superior pressure of liquid in said duct, whereupon liquid under such pressure will flow into said secondary air chamber; means in said secondary air chamber to hold said closure member in open relation to said seat until a material portion of said liquid has passed out of said secondary air chamber; and means for admitting air to said secondary chamber to build up a pressure therein.

5. In a surge device of the character described, for connection with a liquid transmission system including a duct, the combination of: a primary air chamber connected to said duct; a secondary air chamber, a member forming a valve passage connecting said secondary chamber to said duct, there being a valve seat in said member disposed so as to face toward the interior of said secondary chamber; a valve closure member to cooperate with said valve seat and being adapted to be urged into closed relation to said valve seat by fluid pressure within said secondary chamber, said valve seat being opened by a superior pressure of liquid in said duct, whereupon liquid under such pressure will flow into said secondary air chamber; a float movable in said secondary chamber and connected to said valve closure member so that said closure member will be held in open position until a material portion of said liquid has passed out of said secondary air chamber; and means for admitting air to said secondary chamber to build up a pressure therein.

6. In a surge device for use with a pipe-line or liquid passage in which periodic pressure impulses occur, the combination of: a shell having an inlet passage for connection to the fluid passage, a primary air chamber having open communication with said inlet passage and a secondary air chamber connected to said inlet passage through a valve passage; valve means for said valve passage, constructed so as to be closed at relatively low pressure and to automatically open when the pressure in said inlet passage exceeds a prescribed value; and means operating to delay the closing of said valve after it has been so opened and liquid has passed into said secondary air chamber, until a material portion of the liquid has passed out of said secondary air chamber.

7. In a surge device of the character described, for connection with a pressure fluid transmission system including a duct, the combination of: a primary air chamber and a secondary air chamber, both connected to said duct, said primary chamber being effective and in open communication with said duct through a relatively low range of pressure, and there being valve means associated with said secondary chamber to effectuate operative communication between said duct and said secondary chamber when the pressure in said duct is within a relatively high range; and means for delaying the closing of said valve means after the same has been opened by the entry of liquid into said secondary chamber, comprising a float means in said secondary chamber and an operating connection between said float means and said valve means.

8. A surge controlling device of the character described arranged for connection to pressure fluid piping, comprising a hollow body structure formed so as to provide a low pressure surge chamber and a high pressure surge chamber, and a float valve in the inlet opening of the high pressure surge chamber having float means to hold it in open condition when there is fluid in said high pressure surge chamber above a prescribed level therein.

9. A surge controlling device of the character described arranged for connection to pressure fluid piping, comprising a hollow body structure formed so as to provide a low pressure surge chamber and a high pressure surge chamber, and a float valve in the inlet opening of the high pressure surge chamber having float means to hold it in open condition when there is fluid in said high pressure surge chamber above a prescribed level therein, and means for feeding air under pressure from an external source into said high pressure chamber.

10. A surge controlling device of the character described arranged for connection to pressure fluid piping, comprising a hollow body structure formed so as to provide a low pressure surge chamber and a high pressure surge chamber, and a float valve in the inlet opening of the high pressure surge chamber having float means to hold it in open condition when there is fluid in said high pressure surge chamber above a prescribed level therein, means for feeding air under pressure from an external source into said high pressure chamber, and means for selective introduction of air into said low pressure chamber.

11. A surge controlling device of the character described arranged for connection to pressure fluid piping, comprising a hollow body structure formed so as to provide a low pressure surge chamber and a high pressure surge chamber, and a float valve in the inlet opening of the high pressure surge chamber having float means to hold it in open condition where there is fluid in said high pressure surge chamber above a prescribed level therein, walls forming an intercommunicating passage from said high pressure surge chamber to said low pressure surge chamber, and a valve in said passage normally closing the same.

RALPH L. FOSTER.